10β-METHYL-13β-ETHYLGON-4,9(11)-DIENES
Filed Aug. 4, 1967
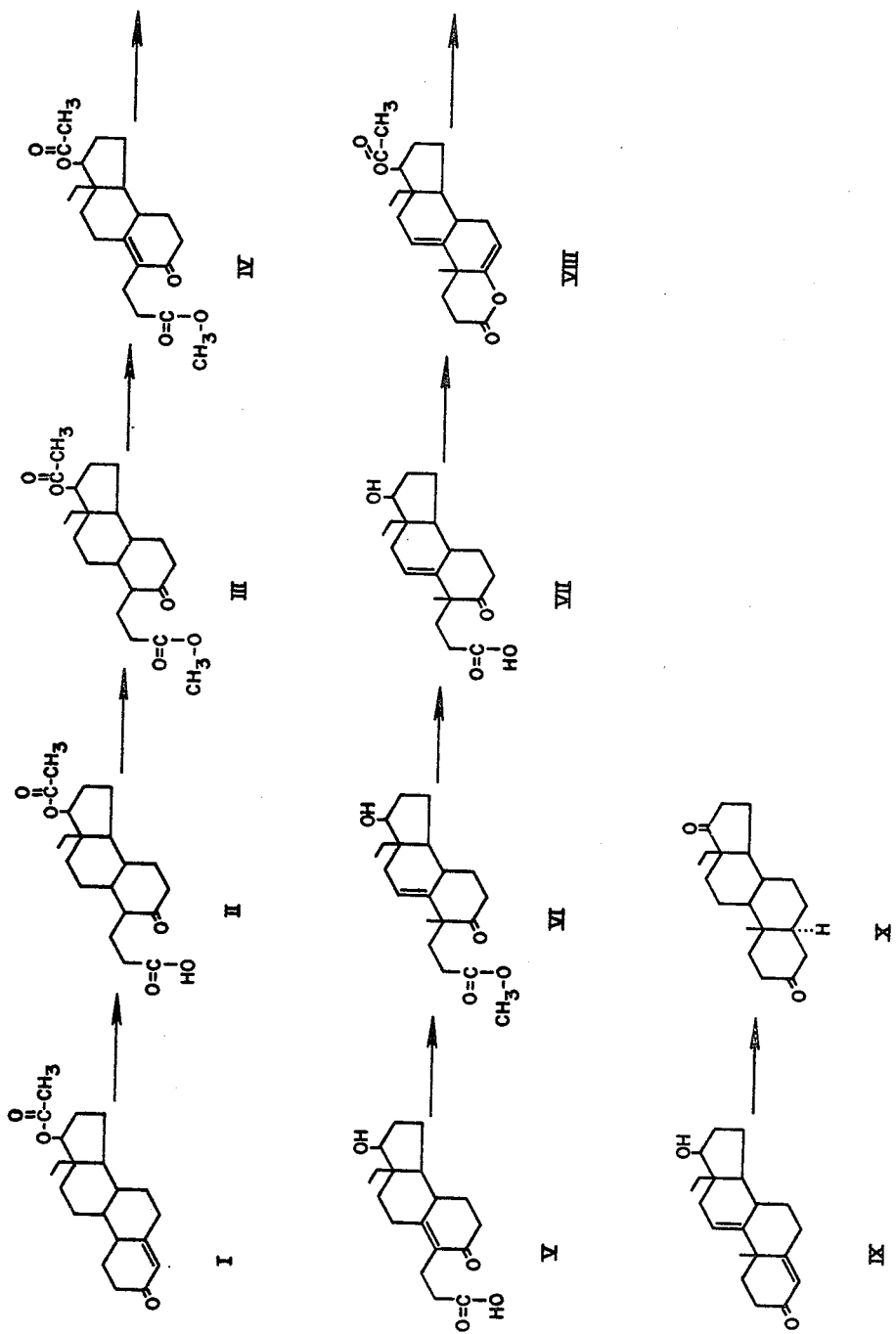
INVENTORS
HERCHEL SMITH
DAVID R. HERBST
BY Vito Victor Bellino
ATTORNEY

United States Patent Office 3,491,131
Patented Jan. 20, 1970

3,491,131
10β-METHYL-13β-ETHYLGON-4,9(11)-DIENES
Herchel Smith and David R. Herbst, Wayne, Pa., assignors to American Home Products Corporation, New York, N.Y., a corporation of Delaware
Filed Aug. 4, 1967, Ser. No. 658,444
Int. Cl. C07c *167/02, 169/22, 171/07*
U.S. Cl. 260—397.45     2 Claims

ABSTRACT OF THE DISCLOSURE

10β-methyl-13β-ethylgon-4,9(11)-dienes having progestational and anti-estrogenic activity are prepared from 13β-ethylgon-4-enes by a sequence of reactions, including ozonization at the 4-position unsaturation, introduction of unsaturation at the 9-position, addition of a methyl group at the 10-position, and reformation of the A-ring.

---

This invention relates to compositions of matter classified in the art of chemistry as 13-ethyl substituted gon-4,9(11)-dienes.

The invention sought to be patented in a principal process aspect is described as residing in the concept of a sequence of reactions, including: ozonizing a 13-polycarbon-alkylgon-4-ene, esterifying the 5-oxo-3,5-seco-4-norgonan-3-oic so produced, brominating at the 10-position carbon and eliminating hydrogen bromide to introduce 9(10)-position unsaturation, hydrolyzing to obtain a 5-oxo-3,5-seco-4-norgon-9(10)-en-3-oic acid, methylating at the 10-position, and reforming the A-ring.

The invention sought to be patented in a principal composition aspect, is described as residing in the concept of a 13β-ethyl-17β-hydroxy-10β-methylgona-4,9(11)-dien-3-one.

The tangible embodiment of the principal composition of the invention possess the inherent general physical properties of being a white crystalline solid, is substantially insoluble in water, is generally soluble in organic solvents, such as dimethylacetamide. Examination of the compound produced according to the hereinafter described process reveals, upon infrared, ultraviolet and nuclear magnetic resonance spectrographic analysis, spectral data supporting the molecular structure herebefore set forth. For example, the 10-methyl and the 13β-ethyl-groups are evident in the nuclear magnetic resonance spectra. The aforementioned physical characteristics taken together with the elemental analysis, the nature of the starting materials, and the mode of synthesis, further confirms the molecular structure hereinbefore set forth for the composition sought to be patented.

The tangible embodiments of the principal compositions of the invention possess the inherent applied use characteristics of exerting qualitatively varying hormonal effects in animals as evidenced by pharmacological evaluation according to standard test procedures. Such tangible embodiments possess progestational and anti-estrogenic activity. In addition to this inherent applied use characteristic, the principal composition of the invention possess the further applied use characteristic of being intermediates for making other compositions which can possess the applied use characteristic of exerting qualitatively varying hormonal effects in animals.

The invention sought to be patented in a secondary composition aspect is described as residing in the concept of the novel intermediates formed in the sequence of reactions for making the principal compositions of the invention, namely (a) 13β-ethyl-17β-hydroxy-5-oxo-3,5-seco-4-norgonan-3-oic acid, acetate; (b) 13β-ethyl-17β-hydroxy-5-oxo-3,5-seco-4-norgonan - 3 - oic acid, acetate, methyl ester; (c) 13β-ethyl-17β-hydroxy-5-oxo-3,5-seco-4-norgon-9-en-3-oic acid, acetate, methyl ester; (a) 13β-ethyl-17β-hydroxy-5-oxo-3,5-seco-4-norgon-9-en-3-oic acid; (e) 13β-ethyl-17β-hydroxy-10β-methyl-5-oxo-3,5-seco-4-norgon-9(11)-en-3-oic acid, methyl ester; (f) 13β-ethyl - 17β - hydroxy - 10β-methyl-5-oxo-3,5-seco-4-norgon-9(11)-en-3-oic acid, methyl ester; (g) 13β-ethyl-17β - hydroxy - 10β - methyl-5-oxo-3,5-seco-4-norgon-9 (11)-en-3-oic acid; and (h) 13β-ethyl-17β-hydroxy-10β-methyl-4-oxagona-5,9(11)-dien-3-one, acetate. Examination of the intermediate compounds produced according to the hereinafter described process reveals upon infrared, ultraviolet and nuclear magnetic resonance spectrographic analysis, spectral data hereinbefore set forth. This data taken together with the elemental analysis, the nature of the starting material, and the mode of synthesis confirms the molecular structure hereinbefore set forth.

The manner of making and using the invention will now be generally described so as to enable a person skilled in the art of chemistry to make and use the same, as follows:

In describing the invention, reference will be made to the annexed drawing which illustrates schematically the reaction sequence for preparing and using the invention.

Referring to said annexed drawing wherein the compounds are assigned Roman numerals sequentially for identification, the starting material, i.e., the 13-ethyl-17β-hydroxygon-4-en-3-one 17-esters (I) are prepared by esterification of the 13 - ethyl - 17β - hydroxygon - 4-en-3-ones described in Smith and Hughes Belgian Patent 608,370 filed Sept. 20, 1961. Ozonization of said starting material in a non-oxidizable polar solvent such as a 1 to 1 mixture of ethyl acetate and glacial acid cleaves the A-ring at the 4,5-unsaturation to form the corresponding 5-oxo-3,5-seco-3-carboxylic acid (II). Esterification of said keto-acid with a reagent such as diazomethane, or by other esterification methods known to those skilled in the art, such as methanol in the presence of toluenesulfonic acid yields the corresponding methyl ester (III). Bromination, as for example, with N-bromo succinimide followed by dehydrobromination introduces unsaturation at the 9,10-position of the keto-acid ester (IV). Hydrolysis with methanolic potassium hydroxide or other base gives 13 - ethyl - 17β - hydroxy - 5 - oxo-3,5-seco-4-norgon-9-en-3-oic acid (V). Methylation with sodium hydride-methyl iodide in dimethylformamide introduces a 10β-methyl group, shifts the unsaturation to the 9,11-position and esterifies the acid group at the 3-position to form 13-ethyl-17β-hydroxy-10β-methyl-5-oxo-3,5-seco-4-norgon-9(11)-en-3-oic acid, methyl ester (VI). Hydrolysis of said 10β-methyl keto-acid ester in the presence of a base such as methanolic potassium hydroxide gives the corresponding acid (VII) which is lactonized with anhydrous sodium acetate-acetic anhydride or other suiable lactonizing agent to form the lactone (VIII). Reaction of the lactone with methyl magnesium bromide followed by treatment with a base such as methanolic potassium hydroxide reforms the A-ring and yields 13β-ethyl - 17β - hydroxy - 10β - methylgona - 4,9(11) - dien-3-one (IX).

From the so-prepared 13β - ethyl-17β-hydroxy-10β-methyl - gona - 4,9(11)-dien-3-one, other homologated steroid derivatives are prepared. For example, the Δ⁴-unsaturation is reduced with lithium in liquid ammonia, hydrogenation with platinum oxide in glacial acetic acid containing perchloric acid reduces the 9(11)-unsaturation and the 3-carbonyl group forming a 3,17-diacetate which on hydrolysis and oxidation yields 13β-ethyl-10β-methyl-5α-gonan-3,17-dione (X).

It will be apparent to those skilled in the art that the starting compounds can bear groups which are unaffected by the process reactions such as, for example but not limited thereto, 6- or 7-methyl, or the starting compounds can bear labile groups such as hydroxy which can be protected by esterification in analogous fashion to the manner in which the 17-hydroxy group is protected in the description hereinabove, and these variations for the processes of the invention, except for the limitations expressed above, are the full equivalents of the process as particularly described.

Similarly in the process of the invention the group at the 13-position can be in addition to ethyl of a longer chain length, such as for example propyl, isopropyl, butyl, isobutyl, pentyl, etc., even cetyl. When such groups are present in the starting material they will appear correspondingly in the intermediates and in the final product, and for the processes of the invention are the full equivalents of the process as particularly described and claimed.

While the tetracyclic compounds in the specification and the appended examples are named either without regard to configuration corresponding to that of the natural steroid, it is to be understood that the product of the given manipulative bears the same configuration as the starting material. Thus if the starting material is a racemic mixture, the product will also be a racemic mixture. If the product is a particular isomer the final product will be the corresponding isomer.

When employed in the applied use characteristic of exerting qualitatively varying hormonal effects, the compound of the invention is administered in pharmaceutical forms known to those skilled in the art of pharmacy. Solid form preparations include tablets, dispersible granules, and capsules. A solid carrier can be one or more substances which may also act as diluents, flavoring agents, solubilizers, lubricants, suspending agents, binders, or tablet disintegrating agents; it can also be an encapsulating material. In the tablets the compound is mixed with a carrier having the necessary binding properties in suitable proportions and compacted in the shape and size desired. The tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethylcellulose, low melting wax, and cocoa butter. Tablets and capsules can be used for oral administration, and can be incorporated into formulations to obtain delayed or sustained release effects.

Liquid form preparations include solutions, suspensions and emulsions. The compounds are insoluble in water, but can be dissolved in aqueous-organic solvent mixtures that are non-toxic in the amounts used. As an example may be mentioned water-propylene glycol solutions for parenteral injection. Liquid preparations can also be formulated in solution, in aqueous polyethyleneglycol. Aqueous suspensions suitable for oral use can be made by dispersing the finely divided compound in water with viscous material, such as natural or synthetic gums, resins, etc., for example, gum arabic, ion-exchange resins, methylcellulose, sodium carboxymethylcellulose, and other known suspending agents.

The quantity of compound in a unit dosage form may be adjusted from less than 1 mg. to 100 mg. (generally within the range of 2.5 to 25 mg.) and the effective dosage depends upon the severity of the condition being treated, the stage, the individual case, and the compound, and will be determined by an attending physician. Generally, a dosage range of from 0.25 to about 15 mg. per kg. of body weight per day constitutes the overall range.

The following examples illustrate the best mode contemplated by the inventors of carrying out the process of the invention and the manner of making and using as intermediates the compositions of the invention.

EXAMPLE 1

$dl$-13$\beta$-ethyl-17$\beta$-hydroxy-5-oxo-3,5-seco-4-norgonan-3-oic acid, acetate Treat a cold ($-5°$ C.) solution of 4.00 g. of $dl$-13$\beta$-ethyl-17$\beta$-hydroxygon-4-en-3-one, acetate in 80 ml. 1:1 ethyl acetate-glacial acetic acid with ozonized oxygen for 1.5 hours. Add a solution of 3.0 ml. of 30% hydrogen peroxide-20 ml. water and after standing at 25° C. for 16 hours, dilute the reaction mass with 300 ml. water and extract with ether. Thoroughly wash the ethereal solution with water, 5% (w./v.) aqueous ferrous sulfate and water. Extract the ethereal fraction with cold 1% (w./v.) aqueous sodium hydroxide and immediately acidify the alkaline extracts with excess, dilute, cold hydrochloric acid. Dissolve the white precipitate in ether, wash with water, dry the solution with sodium sulfate and evaporate the solvent. Recrystallize (twice) the crude keto acid from acetone-n-hexane to obtain the title compound, M.P. 149.5–150.5° C.

$\lambda_{max.}^{KBr}$ 3.85, 5.80, 5.85 (sh), 8.04$\mu$

Found: C, 68.64; H, 8.82. $C_{20}H_{30}O_5$ requires: C, 68.54; H, 8.63.

EXAMPLE 2

$dl$-13$\beta$-ethyl-17$\beta$-hydroxy-5-oxo-3,5-seco-4-norgonan-3-oic acid, acetate, methyl ester Treat a cold (0°) suspension of 16.19 g. of $dl$-13$\beta$-ethyl-17$\beta$-hydroxy-5-oxo-3,5-seco-4-norgonan-3-oic acid, acetate in 100 ml. anhydrous ether with excess ethereal diazomethane (prepared from 15 g. N-methyl-N-nitrosourea) for 2 hours. Decompose the excess diazomethane with 15 ml. of glacial acetic acid and wash the organic solution with dilute aqueous potassium bicarbonate, water, dry with sodium sulfate and remove the solvent. Chromatographically purify the amber oil on a 500 g. column of silica gel and distill the oil isolated from the 1:4 ether-benzene eluates at 217–220° C./0.15 mm. to provide the title compound $\lambda_{max.}^{film}$ 5.75, 5.84, 8.04$\mu$ Found: C, 69.20; H, 8.76. $C_{21}H_{32}O_5$ requires: C, 69.20; H, 8.85.

EXAMPLE 3

$dl$-13$\beta$-ethyl-17$\beta$-hydroxy-5-oxo-3,5-seco-4-norgon-9-en-3-oic acid, acetate, methyl ester Stir and illuminate (with 2 500 watt G.E. photoflood lamps) a mixture of 1.82 g. of $dl$-13$\beta$-ethyl-17$\beta$-hydroxy-5-oxo-3,5-seco-4-norgonan-3-oic acid, acetate, methyl ester, 1.34 g. of N-bromosuccinimide, 80 ml. carbon tetrachloride and 30 ml. n-pentane. After refluxing commences, continue for 0.3 hour, then cool the mixture to 15° C., filter and distill the organic solvents from the filtrate. Heat (under nitrogen) the residual oil with 20 ml. dry dimethylformamide and 0.82 g. lithium chloride at 110° C. (heating bath temperature) for 3.5 hours. After cooling, dilute the brown solution with ether and shake it with 50 ml. ice-water. Separate the organic layer and wash it successively with water, dilute aq. hydrochloric acid, water, dilute aqueous potassium bicarbonate and water. After drying (sodium sulfate) evaporate the ether from the solution to isolate 1.64 g. brown oil.

Reflux (under nitrogen) an 0.80 g. portion of the preceding oil with 10 ml. absolute ethanol, 1.40 g. Girard's T reagent and 1.34 ml. of glacial acetic acid for 3 hours. Dilute the cooled solution with 50 ml. water and extract with ether. Adjust the aqueous fraction to pH 5.5 with solid sodium carbonate, keep at 25° C. for 16 hours, extract with ether and then adjust the pH to 2.0 with concentrated hydrochloric acid. After 11 hours, thoroughly extract the acidic solution with chloroform, wash the extracts with cold, dilute aqueous sodium hydroxide, water, dry (sodium sulfate) and remove the chloroform. Crystallize (twice) the residue from n-hexane to obtain the title compound, M.P. 85–88°.

$\lambda_{max.}^{KBr}$ 5.79, 6.03, 6.23, 8.15$\mu$. $\lambda_{max.}^{95\% \ EtOH}$ 248.5 ($\epsilon$ 14,660) m$\mu$ Found: C, 69.78; H, 8.32. $C_{21}H_{30}O_5$ requires C, 69.58; H, 8.34.

EXAMPLE 4 dl-13β-ethyl-17β-hdroxy-5-oxo-3,5-seco-4-norgonan-9-en-3-oic acid

After refluxing (under nitrogen) a solution of 0.40 g. dl-13β-ethyl-17β-hydroxy-5-oxo-3,5-seco-4 - norgon-9-en-3-oic acid, acetate, methyl ester, 50 ml. methanol and 0.50 g. potassium hydroxide for 10 hours, dilute the solution with 500 ml. brine, extract with ether and acidify the aqueous fraction with excess, dilute aqueous hydrochloric acid. Extract the precipitate thus formed with ether, wash the ethereal solution with brine, dry (sodium sulfate) and distill the solvent. Crystallize (twice the residue from acetone-n-hexane to provide the title compound, dec. 163.5–165.5°, $\lambda_{max}^{KBr}$ 2.94, 4.00, 5.85, 6.03, 6.22μ, $\lambda_{max}^{95\% EtOH}$ 247 (ε 14,510) mμ

Found: C, 70.45; H, 8.32. $C_{18}H_{26}O_4$ requires: C, 70.56; H, 8.55.

EXAMPLE 5 dl-13β-ethyl-17β-hydroxy-10β-methyl-5-oxo-3,5-seco-4-norgon-9(11)-en-3-oic acid, methyl ester Stir a mixture of 6.41 g. of dl-13β-ethyl-17β-hydroxy-5-oxo-3,5-seco-4-gon-9-en-3-oic acid and 250 ml. dry dimethylformamide under nitrogen with 2.41 g. ca. 50% sodium hydride-mineral oil dispersion for one hour at 100–110° C. After cooling to 5° C., add 89.1 g. (39.1 ml.) methyl iodide and stir the mixture for 2 hours at 25° C. Distill (in vacuo) the solvent, dissolve the residue in 250 ml. dichloromethane, shake with 60 ml. 1 N HCl, wash with water and dry (magnesium sulfate). As thin-layer chromatographic examination of the organic solution indicates the presence of considerable acidic material, treat the dichloromethane solution with 150 ml. ethereal diazomethane (prepared from 20 g. N-methyl-N-nitrosourea) for 0.5 hr. at 25° C. Add glacial acetic acid (15 ml.) cautiously and dilute the reaction solution with dichloromethane (100 ml.), wash successively with water, dilute aqueous potassium bicarbonate, water and dry (magnesium sulfate). Remove the solvent and chromatographically purify the residual oil on a 280 g. column of neutral, activity III alumina to obtain, from the benzene and 1:9 ether-benzene eluates, 4.53 g. of title compound as a pale yellow oil $\lambda_{max}^{film}$ 2.93, 5.75, 5.85, 6.11μ

NMR (CDCl$_3$): 74 (singlet, 10β-CH$_3$), 219 (singlet, CO$_2$CH$_3$), 231 (multiplet 17α-H), 333 (doublet, 11-H) cps.

EXAMPLE 6 dl-13β-ethyl-17β-hydroxy-10β-methyl-5-oxo-3,5-seco-4-norgon-9(11)-en-3-oic acid

Reflux potassium hydroxide (2.13 g.), dl-13β-ethyl-17β-hydroxy-10β-methyl-5-oxo - 3,5 - seco-4-norgon-9(11)-en-2-oic acid, methyl ester (4.23 g.), 15 ml. water and 135 ml. methanol under nitrogen for one hour. Distill the methanol and dissolve the residue in 200 ml. water and extract with 50 ml. ether. Acidify the aqueous solution with 25 ml. 2 N HCl, extract the product into ether, wash with brine, and dry (magnesium sulfate). Evaporate the ether to provide 3.72 g. crude title compound, melting 141–158° C. Recrystallize (twice) a 250 mg. portion from ethyl acetate to afford 164 mg. title compound, softens 160° C., M.P. 165–166.5°.

$\lambda_{max}^{KBr}$ 3.00, 3.78 (sh.), 3.90, 5.81, 5.91, 6.11μ

NMR (d DMSO): 70 (singlet, 10β-CH$_3$), 221 (multiplet, 17α-H), 330 (doublet, 11-H) cps. Found: C, 71.22; H, 8.74. $C_{19}H_{28}O_4$ requires: C, 71.22; H, 8.81.

EXAMPLE 7 dl-17β - Acetoxy - 13β-ethyl-5-hydroxy-10β-methyl-3,5-seco-4-norgona-5,9(11)-dien-3-oic acid, 3,5-lactone Reflux a solution of 3.39 g. of dl-13β-ethyl-17β-hydroxy-10β-methyl - 5 - oxo-3,5-seco-4-norgon-9(11)-en-3-oic acid, 70 ml. acetic anhydride and 700 mg. freshly fused sodium acetate under nitrogen for 2 hours and then distill the acetic anhydride in vacuo. Shake the residue with 200 ml. ice-water and 50 ml. 2 N HCl, extract into ether, wash with water and dry (magnesium sulfate). Distill the ether and crystallize the gum from n-hexane to yield 2.21 g. solid product, softens 90° C., M.P. 100–106° C.

Recrystallize a 204 mg. aliquot from hexane to afford 105 mg. title compound, M.P. 109–111.5° C.

$\lambda_{max}^{KBr}$ 5.70 (sh.), 5.76, 5.93, 6.07, 7.44, 7.53, 8.10μ

NMR (CDCl$_3$): 75 (singlet, 10β-CH$_3$), 121 (singlet, O$_2$CCH$_3$), 287 (multiplet, 17α-H), 319 (multiplet, 6-H), 333 (doublet, 11-H) cps.

Found: C, 73.23; H, 8.20. $C_{21}H_{28}O_4$ requires: C, 73.22; H, 8.19.

EXAMPLE 8 dl-13β-ethyl-17β-hydroxy-10β-methylgona 4,9(11)-dien-3-one

Under a nitrogen atmosphere, stir a solution of 2.00 g. of dl-17β - acetoxy - 13β-ethyl-5-hydroxy-10β-methyl-3,5-seco-4-norgona-5,9(11)-dien-3-oic acid, 3,5-lactone in 300 ml. 1:3 benzene-ether at —55° C. (Dry-Ice 1:1 chloroform/carbon tetrachloride bath) and add dropwise 7.83 ml. 3 N ethereal methyl magnesium bromide during 50 minutes. Maintain the reaction temperature below —45° C. for 1.5 hours, remove the cooling bath and add 5.0 ml. acetone followed by 20 ml. 3.5 N aqueous acetic acid. Stir 0.25 hour longer while the reaction temperature rises to 5° C., separate the aqueous layer and extract it with chloroform (25 ml.). Combine this extract with the ether-benzene fraction and wash successively with water, dilute aqueous sodium bicarbonate, water, dry (magnesium sulfate), and remove the solvent. Reflux the resulting white foam, 120 ml. methanol, 4.00 g. potassium hydroxide and 12 ml. water for 2 hours under nitrogen. Remove the methanol, shake the residue with ether and water and wash the ether fraction with water and dry (magnesium sulfate). Evaporate the ether to obtain 0.80 g. yellow solid and chromatographically purify this material on a 150 g. column of silica gel. From the 1:1 ethyl acetate-benzene eluates isolate a white solid (525 mg.), M.P. 159–163°. Recrystallize (twice) this solid from di-isopropyl ether to provide 343 mg. title compound, M.P. 164–166°, $\lambda_{max}^{KBr}$ 3.00, 6.03, 6.10 (sh.), 6.19μ $\lambda_{max}^{95\% EtOH}$ 240 (ε 16,850) mμ

NMR (CDCl$_3$): 81 (singlet, 10β-CH$_3$), 132 (singlet, 17β 0-H), 232 (multiplet, 17α-H), 334 (doublet, 11-H), 345.5 (singlet, 4-H) cps. Found: C, 80.20; H, 9.39. $C_{20}H_{28}O_2$ requires: C, 79.75; H, 9.39.

EXAMPLE 9 dl-13β-ethyl-10β-methylgonan-3,17-dione

Add dl-13β-ethyl - 17β - hydroxy-10β-methylgona-4,9-(11)-dien-3-one (377 mg.) in 16 ml., 1:1 dioxane-ether dropwise to a stirred solution of 131 mg. lithium in 50 ml. liquid ammonia (distilled from sodium). After 25 min., discharge the blue color with 3.0 g. ammonium chloride and carefully evaporate the ammonia. Dissolve the residue in chloroform and wash the solution with water and dry (MgSO$_4$). Distill the solvent to obtain a yellow gum.

Add a solution of the preceding yellow gum in 25 ml. of acetic acid-0.3 ml. 70% perchloric acid to a pre-reduced suspension of 400 mg. platinum oxide (83.74%) in 15 ml. glacial acetic acid and hydrogenate at atmospheric pressure and 25° C. for 15 hours. Remove the catalyst by filtration and dissolve the filtrate in chloroform (150 ml.). Wash the organic solution with water, dilute aqueous potassium bicarbonate solution, and water, dry (MgSO$_4$) and remove the solvent. Since NMR examination of the residual gum reveals incomplete hydrogenation of the 9(11)-double bond, rehydrogenate the residue for three hours and isolate the gummy diacetate.

Reflux (under nitrogen) this diacetate with 355 mg. potassium hydroxide, 20 ml. methanol and 2.0 ml. water for two hours, cool, distill the solvent and wash an ethereal solution of the residue with brine and dry (MgSO$_4$). Evaporate the solvent to obtain a crude diol as a white foam.

Stir the preceding product in 30 ml. acetone at 0° C. and add dropwise 1.0 ml. Jones' reagent (2.67 mmoles CrO$_3$). After ¼ hr., treat the mixture with 1.0 ml. isopropanol and 500 mg. sodium bicarbonate and remove the solvents. Extract the residue with ether and wash the combined extracts with water. Dry (MgSO$_4$) the solution and evaporate the ether to isolate a gum. Dissolve the gum in a minimal amount of benzene and chromatographically purify on a column of neutral, activity III alumina to obtain, from the 1:1 benzene-hexane and 100% benzene eluates, 171 mg. white crystals, M.P. 162–169°. Recrystallize (thrice) the crude dione from diisopropyl ether to obtain 81 mg. title compound as white needles, M.P. 172.5–174.0°, $\lambda_{max.}^{KBr}$ 5.82$\mu$, NMR (CDCl$_3$): 63 (singlet, 19-H) cps. Found: C, 79.68; H, 10.05. C$_{20}$H$_{30}$O$_2$ requires: C, 79.42; H, 10.00.

The subject matter which the applicants regard as their invention is particularly pointed out and distinctly claimed as follows:

1. The process for preparing (a) 10$\beta$-methyl-13$\beta$-polycarbonalkylgona-4,9(11)-dienes bearing a substituent group or groups which are not labile to oxidation or which may be protected from oxidation by esterification comprising (1) ozonizing with ozone a 13-polycarbonalkylgon-4-ene in a non-oxidizable polar solvent, (2) esterifying the 5-oxo-3,5-seco-4-norgonan-3-oic acid so produced, (3) brominating with an allylic brominating agent at the 10-position carbon and eliminating hydrogen bromide in the presence of a base to introduce 9(10)-position unsaturation, (4) hydrolyzing in the presence of base to obtain a 5-oxo-3,5-seco-4-norgon-9(10)-en-3-oic acid, (5) methylating with a methylating reagent in the presence of a strong base at the 10-position, and (6) reforming the A-ring by ring closure of a protected enol lactone derived from the keto acid.

2. 13$\beta$-ethyl - 17$\beta$ - hydroxy-10$\beta$-methylgona-4,9(11)-dien-3-one.

References Cited

UNITED STATES PATENTS 2,769,019  10/1956  Herr et al. _____ 260—397.45

HENRY A. FRENCH, Primary Examiner

U.S. Cl. X.R.

260—343.2, 397.3, 468, 488, 514, 999